United States Patent
Kawahara et al.

(10) Patent No.: US 12,341,390 B2
(45) Date of Patent: Jun. 24, 2025

(54) STATOR OF ELECTRIC MOTOR AND MANUFACTURING METHOD FOR STATOR OF ELECTRIC MOTOR

(71) Applicant: Hitachi Astemo, Ltd., Hitachinaka (JP)

(72) Inventors: Keiji Kawahara, Hitachinaka (JP); Masato Higuma, Hitachinaka (JP); Yasuhiko Kimura, Hitachinaka (JP); Kenichi Nakayama, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 244 days.

(21) Appl. No.: 17/924,870

(22) PCT Filed: Feb. 2, 2021

(86) PCT No.: PCT/JP2021/003649
§ 371 (c)(1),
(2) Date: Nov. 11, 2022

(87) PCT Pub. No.: WO2021/229865
PCT Pub. Date: Nov. 18, 2021

(65) Prior Publication Data
US 2023/0216364 A1    Jul. 6, 2023

(30) Foreign Application Priority Data

May 13, 2020    (JP) .................... 2020-084323

(51) Int. Cl.
*H02K 3/28*        (2006.01)
*B21F 3/02*        (2006.01)
(Continued)

(52) U.S. Cl.
CPC ............... *H02K 3/28* (2013.01); *B21F 3/02* (2013.01); *H02K 3/04* (2013.01); *H02K 15/35* (2025.01)

(58) Field of Classification Search
CPC .. H02K 3/28; H02K 15/0081; H02K 2213/03; H02K 15/0421; H02K 3/12;
(Continued)

(56) References Cited

U.S. PATENT DOCUMENTS

2010/0026113 A1* 2/2010 Nakamura ............... H02K 3/12
                                                    310/64
2010/0252139 A1   10/2010 Akimoto et al.
(Continued)

FOREIGN PATENT DOCUMENTS

CN          1489259 A      4/2014
JP       2004-297863 A    10/2004
(Continued)

OTHER PUBLICATIONS

JP2018098348A English translation (Year: 2024).*
International Search Report and Written Opinion in International Application No. PCT/JP2021/003649 dated May 25, 2021.

*Primary Examiner* — Christopher M Koehler
*Assistant Examiner* — Viswanathan Subramanian
(74) *Attorney, Agent, or Firm* — Foley & Lardner LLP

(57) ABSTRACT

An object of the present invention is to suppress variations in an angle of a shoulder part of a segment coil to improve easiness in inserting segment coils in a stator core.
A stator of an electric motor according to the present invention includes a stator core 12 in which a plurality of slots 12a are formed, and a plurality of segment coils 11 of U shapes inserted respectively in the plurality of slots 12a. The segment coil 11 includes a shoulder part 11a and a shoulder part 11b that are bent to form a U shape. In a front view of the U shape, a press mark 100a is formed on the shoulder part 11a and on the shoulder part 11b, the press mark being a dent sinking in a front-to-rear direction, from a front surface of the shoulder part 11a and from a front surface of the shoulder part 11b. The press mark 100a is
(Continued)

formed also on a back surface of the shoulder part 11a and on a back surface of the shoulder part 11b.

11 Claims, 16 Drawing Sheets

(51) Int. Cl.
*H02K 3/04* (2006.01)
*H02K 15/35* (2025.01)

(58) Field of Classification Search
CPC ... B21F 3/02; B21F 5/00; B21K 23/00; Y02T 10/64
See application file for complete search history.

(56) References Cited

U.S. PATENT DOCUMENTS

| | | |
|---|---|---|
| 2016/0254718 A1 | 9/2016 | Watanabe et al. |
| 2019/0190359 A1 | 6/2019 | Miyawaki et al. |

FOREIGN PATENT DOCUMENTS

| | | |
|---|---|---|
| JP | 2010-246283 A | 10/2010 |
| JP | 2014-135857 A | 7/2014 |
| JP | 2016-163374 A | 9/2016 |
| JP | 2018-098348 A | 6/2018 |
| JP | 2019-050677 A | 3/2019 |

\* cited by examiner

CROSS-SECTIONAL VIEW

FRONT VIEW OF SEGMENT COIL
NOT SUBJECTED TO BENDING PROCESS YET

CROSS-SECTIONAL VIEW OF SEGMENT COIL
NOT SUBJECTED TO BENDING PROCESS YET,
THE CROSS-SECTIONAL VIEW BEING TAKEN ALONG VIB—VIB LINE

FRONT VIEW OF SEGMENT COIL HAVING
BEEN SUBJECTED TO BENDING PROCESS BUT
NOT HAVING PRESS MARK FORMED THEREON YET

CROSS-SECTIONAL VIEW OF SEGMENT COIL HAVING
BEEN SUBJECTED TO BENDING PROCESS BUT
NOT HAVING PRESS MARK FORMED THEREON YET,
THE CROSS-SECTIONAL VIEW BEING TAKEN ALONG VIIB — VIIB LINE

FRONT VIEW OF SEGMENT COIL
ON WHICH PRESS MARK HAS BEEN FORMED

CROSS-SECTIONAL VIEW OF SEGMENT COIL
ON WHICH PRESS MARK HAS BEEN FORMED,
THE CROSS-SECTIONAL VIEW BEING TAKEN ALONG VIIIB — VIIIB LINE

| | | 7a | 7b | 7c | FILM THICKNESS (μm) |
|---|---|---|---|---|---|
| BEFORE BENDING PROCESS | FIG. 6B | 61 | 61 | 66 | |
| AFTER BENDING PROCESS/ BEFORE PRESS MARK FORMATION | FIG. 7B | 61 | 52 | 74 | |
| AFTER BENDING PROCESS/ AFTER PRESS MARK FORMATION | FIG. 8B | 52 | 52 | 74 | | ic MOTOR AND
MANUFACTURING METHOD FOR STATOR
OF ELECTRIC MOTOR

TECHNICAL FIELD

The present invention relates to a stator of an electric motor and a manufacturing method for a stator of an electric motor.

BACKGROUND ART

An in-vehicle drive motor is required to be small in size, light in weight, capable of high power output, and highly efficient. A motor structure that meets this requirement is constructed by a technique of inserting a plurality of segment coils made of rectangular wires in a stator core and welding ends of the segment coils together. A stator mainly used in electric vehicles is required to be a long, cylindrical shape that is expected to allow the high-speed rotation of the motor, in which case, however, the stack thickness of the stator core tends to increase. As a result, the segment coils inserted in the stator core need to be increased in length to match up with the stator core with the increased stack length.

Conventionally, each segment coil is formed in such a way as to have a coil end top, coil end conductor sloped parts located on both sides of the coil end top, and conductor straight parts extending respectively in a direction opposite to the coil end top, from the coil end conductor sloped parts. In addition, a shoulder part is formed between each coil end conductor sloped part and each conductor straight part. The segment coil is formed by bending a rectangular conductor, using a jig or a forming die.

As methods of forming the segment coil, for example, techniques described in PTLs 1 to 3 have been proposed.

According to PTLs 1 and 2, a wire rod is set between a first forming die and a second forming die to form a coil end formation part, and two forming rollers are moved down along side surfaces of the second forming die, onto a part outside the coil end formation part to form two slot insertion parts (conductor straight parts). The angle of shoulder parts formed by a bending process by the forming rollers determines the size of a pitch between respective open ends of the slot insertion parts. The size of the pitch between respective open ends of the slot insertion parts is changed by springing back. For this reason, when the slot insertion part is formed by using the forming roller, the shoulder part is bent at a larger angle larger than a target bending angle of the shoulder by an expected angle of springing back so that the angle of the shoulder part matches the target bending angle after all.

According to PTL 3, a device of a cam structure is used to achieve a finishing angle of the shoulder part. By this device, the shoulder part is bent at a larger angle larger than a target bending angle of the shoulder by an expected angle of springing back so that the angle of the shoulder part matches the target bending angle after all. In PTL 3, the angle of the shoulder part formed in such a manner ensures the proper size of a pitch between open ends of slot storage parts.

CITATION LIST

Patent Literature

PTL 1: JP 2004-297863 A
PTL 2: JP 2014-135857 A
PTL 3: JP 2010-246283 A

SUMMARY OF INVENTION

Technical Problem

Variations in the size of the pitch between respective open ends of the slot insertion parts of the segment coil may arise.

Because the size of the pitch between respective open ends of the slot insertion parts is determined by the angle of the shoulder part, variations in the angle of the shoulder part affect variations in the size of the pitch between respective open ends of the slot insertion parts.

In a stator for use in electric vehicles, the stack thickness of a stator core tends to increase. When the stack thickness of the stator core increases, the length of slot insertion parts of segment coils increases to match the segment coils in size to the stator core. An increase in the length of the slot insertion parts leads to an increase in variations in the size of a pitch between respective open ends of slot insertion parts.

According to the techniques described in PTLs 1 to 3, the angle of the shoulder part is adjusted as the angle of springing back is taken into consideration. However, variations in the size of the pitch between respective open ends of slot insertion parts, the variations increasing as a result of an increase in the length of the slot insertion parts, is not taken into consideration.

As a result of the variations in the size of the pitch between respective open ends of slot insertion parts, when the segment coils are inserted in slots of the stator core, the slot insertion parts of the segment coils come in contact with a side surface of the stator core. In this case, when an insulation paper is placed in each slot, the slot insertion part damages the insulation paper, which is a problem.

Because the slot insertion parts of the segment coils come in contact with the stator core and the insulation paper, an insertion load of the segment coils increases, making it necessary to push in the segment coils with an unnecessarily large force. This causes the segment coils to deform and makes segment coil insertion further difficult, which is a problem.

To take into consideration the variations in the size of the pitch between respective open ends of slot insertion parts and minimize the contact between the stator core and each segment coil, for example, a method may be adopted by which the size of the slot is increased to create a larger gap between the stator core and the segment coil, thereby improving easiness in inserting the segment coil. In this case, however, the ratio of an area occupied by the segment coil in the slot reduces, which raises a problem of a drop in the performance of the electric motor.

Variations in the angle of the shoulder part of the segment coil arise due to variations in the hardness of copper making up the segment coil, variations in a position of winding the coil around a bobbin and in a machining stress that is applied to the wound coil when straightening the coil up, and changes in an angle of springing back against a bent angle, the changes resulting from differences in coil size. The segment coil is, therefore, formed in the following manner: the coil wound around the bobbin is straightened up, is subjected to a bending process, and then a bending angle of the shoulder part is adjusted so that the angle of the shoulder part is within a given angle range, by which variations in an angle of springing back are suppressed.

This adjustment varies depending on a condition of the segment coil, and every time the size of the pitch is out of a given range, the adjustment needs to be made. As a result, much manhour is required for the adjustment, which leads to lower productivity.

An object of the present invention is to provide a stator of an electric motor and a manufacturing method for a stator of an electric motor, the stator and the manufacturing method suppressing variations in an angle of a shoulder part of a segment coil to improve easiness in inserting segment coils in a stator core.

Solution to Problem

In order to achieve the above object, the present invention provides a stator of an electric motor, the electric motor including the stator in which a plurality of slots are formed, and a plurality of segment coils of U shapes inserted respectively into the plurality of slots. The segment coil includes a first bent part and a second bent part that are bent to form a U shape. In a front view of the U shape, a press mark is formed on the first bent part and on the second bent part, the press mark being a dent sinking in a front-to-rear direction, from one surface of the first bent part and from one surface of the second bent part.

The present invention provides a manufacturing method for a stator of an electric motor in which a plurality of segment coils of U shapes are inserted respectively into a plurality of slots formed in the stator. The segment coil includes a first bent part and a second bent part that are bent to form a U shape. In a front view of the U shape, press marks are formed on the first bent part and on the second bent part, the press marks being dents sinking in a front-to-rear direction, from one surface of the first bent part and another surface opposite to the one surface of the first bent part, respectively, and from one surface of the second bent part and another surface opposite to the one surface of the second bent part, respectively. The press marks are formed by a press mark forming device. The press mark forming device includes an upper punch that forms a press mark on one surface of the segment coil, a press plate that has the upper punch and gives a press force to the upper punch, an upper work holding plate that has an upper guide hole formed thereon to guide movement of the upper punch, a lower punch that forms a press mark on another surface of the segment coil, a receiving plate that has the lower punch and gives a press force to the lower punch, a lower work holding plate that has a lower guide hole formed thereon to guide movement of the lower punch, and a guide pin that adjusts respective angles of the first bent part and the second bent part of the segment coil. The press mark forming device executes the steps of setting the segment coil on the lower work holding plate, moving the upper work holding plate toward the lower work holding plate to fix the segment coil, operating the guide pin to adjust respective angles of the first bent part and the second bent part of the segment coil to target angles, applying a load to the holding plates to form the press marks respectively on the first bent part and the second bent part of the segment coil, releasing the load applied to the holding plates, and separating the upper work holding plate from the lower work holding plate.

Advantageous Effects of Invention

The present invention provides a stator of an electric motor and a manufacturing method for a stator of an electric motor, the stator and the manufacturing method suppressing variations in an angle of a shoulder part of a segment coil to improve easiness in inserting segment coils in a stator core.

BRIEF DESCRIPTION OF DRAWINGS

FIG. 4A is a cross-sectional view of a principal part of a stator core 12, showing a state in which a conductor straight part 11g of the segment coil 11 is inserted in a slot 12a in such a way as to be at a central part of the slot 12a.

FIG. 4B is a cross-sectional view of the principal part of the stator core 12, showing a state in which the conductor straight part fig of the segment coil 11 is inserted in the slot 12a in such a way as to be at a one-sided position on a side surface of the slot 12a.

FIG. 5A is an enlarged view of the principal part, showing a target bending angle of a shoulder part 11a.

FIG. 9 is a table in which film thicknesses of segment coils shown in FIGS. 6B, 7B, and 8B are compared.

FIG. 10 depicts a relationship between the size of a pitch between an open end 11m and an open end 11n of conductor straight parts and the depth of a press mark 100a.

DESCRIPTION OF EMBODIMENTS

Embodiments of the present invention will hereinafter be described with reference to the drawings. The same constituent elements will be denoted by the same reference signs, and the same description will not be repeated.

Various constituent elements of the present invention do not necessarily need to be independent of each other. The present invention allows one constituent element to be composed of a plurality of members, allows a plurality of constituent elements to be composed of one member, allows a constituent element to be a part of another constituent element, and allows a part of a constituent element and a part of another constituent element to overlap each other.

First Embodiment

Figure 1:
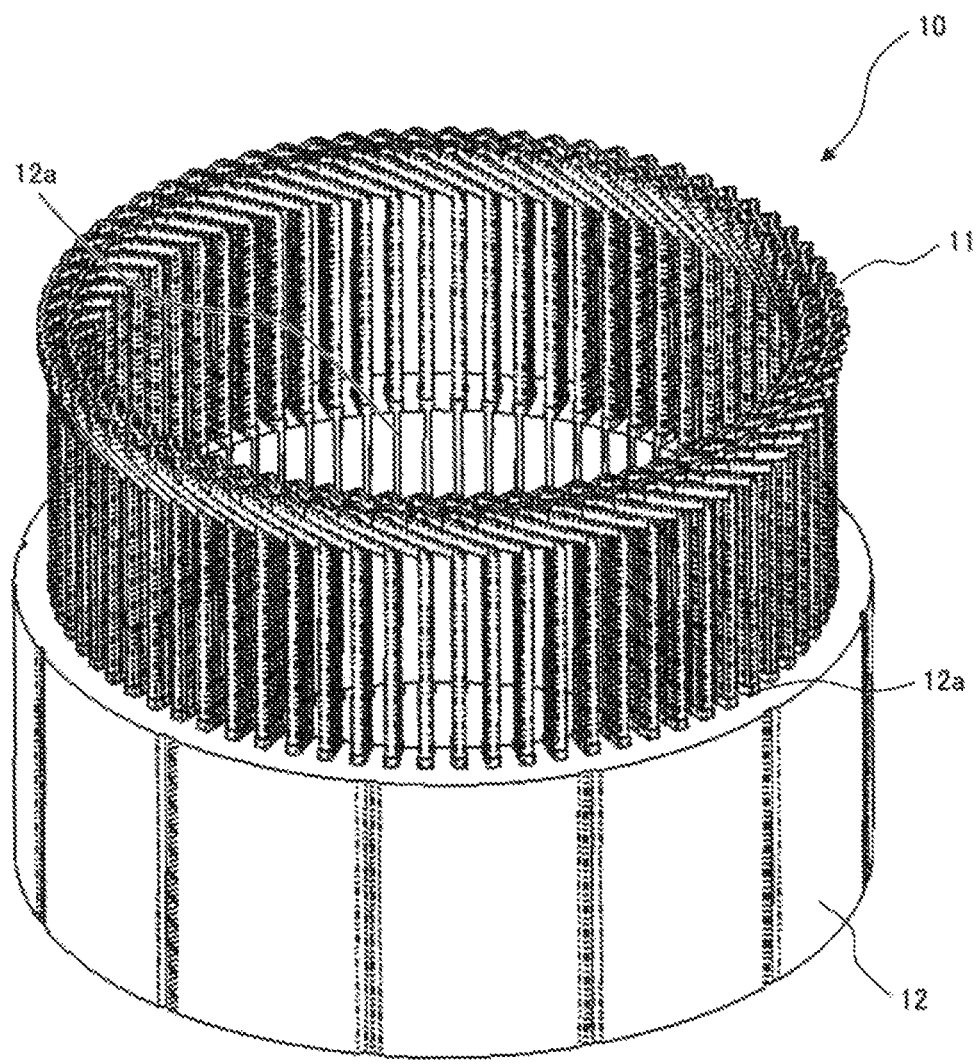
FIG. 1 is a perspective view showing a state in which segment coils according to a first embodiment of the present invention are inserted temporarily into a stator core of an electric motor.
Figure 2:
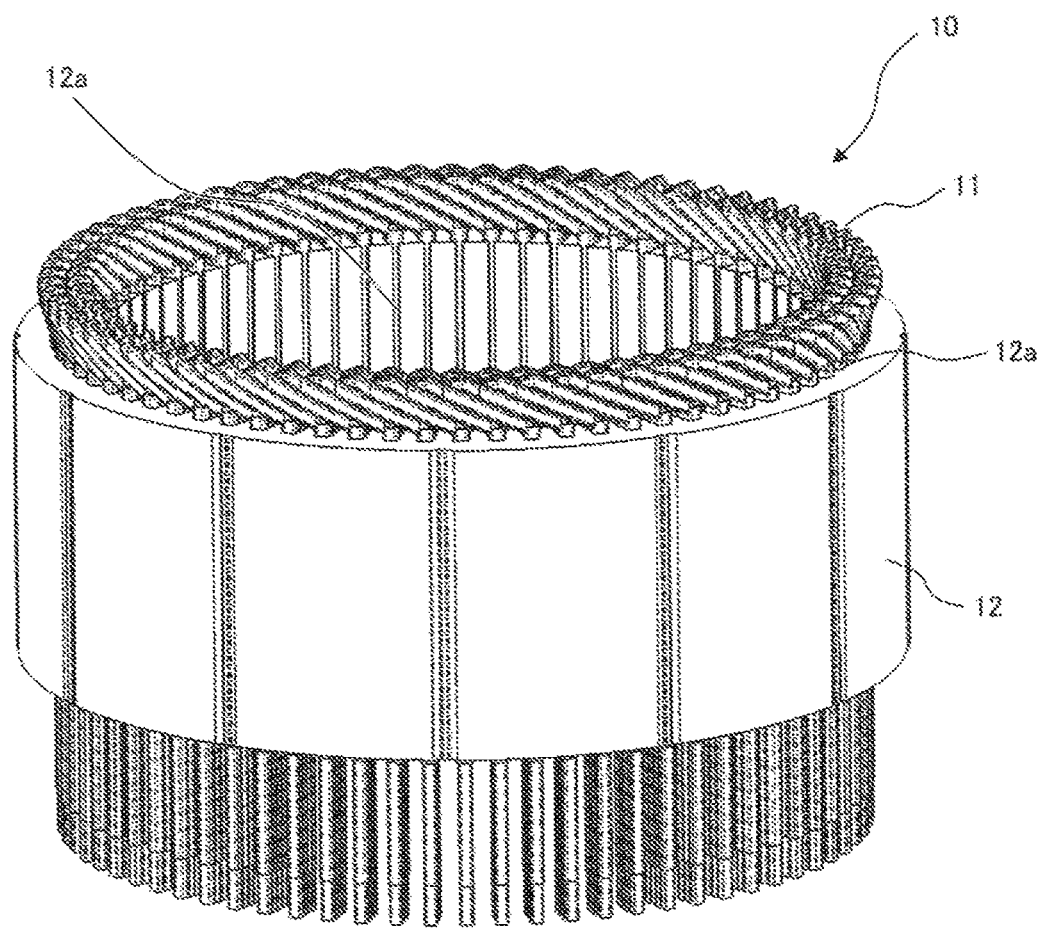
FIG. 2 is a perspective view showing a state in which the segment coils according to the first embodiment of the present invention are inserted completely into the stator core of the electric motor.

A structure of a stator of an electric motor will be described. FIG. 1 is a perspective view showing a state in which segment coils according to a first embodiment of the present invention are inserted temporarily into a stator core of the electric motor, and FIG. 2 is a perspective view showing a state in which the segment coils according to the first embodiment of the present invention are inserted completely into the stator core of the electric motor.

The electric motor includes a rotor (not illustrated), and a stator 10. The stator 10 includes a stator core 12 composed of a stack of electromagnetic steel plates, a plurality of slots 12a formed in the stator core 12, and segment coils 11 inserted into the slots 12a.

The segment coils 11 are each formed by bending a wire rod into a U shape. As shown in FIG. 1, the plurality of segment coils 11 each formed into the U shape are inserted in the slots 12a by pushing the bottom of the U shape of each segment coil 11 have its open ends facing slots 12a of the stator core 12 to force the segment coil 11 into the slots 12a. As a result, as shown in FIG. 2, the segment coils 11 are fitted in the slots 12a of the stator core 12, with the open ends of the segment coils 11 projecting out of the slots 12a.

Figure 3A:
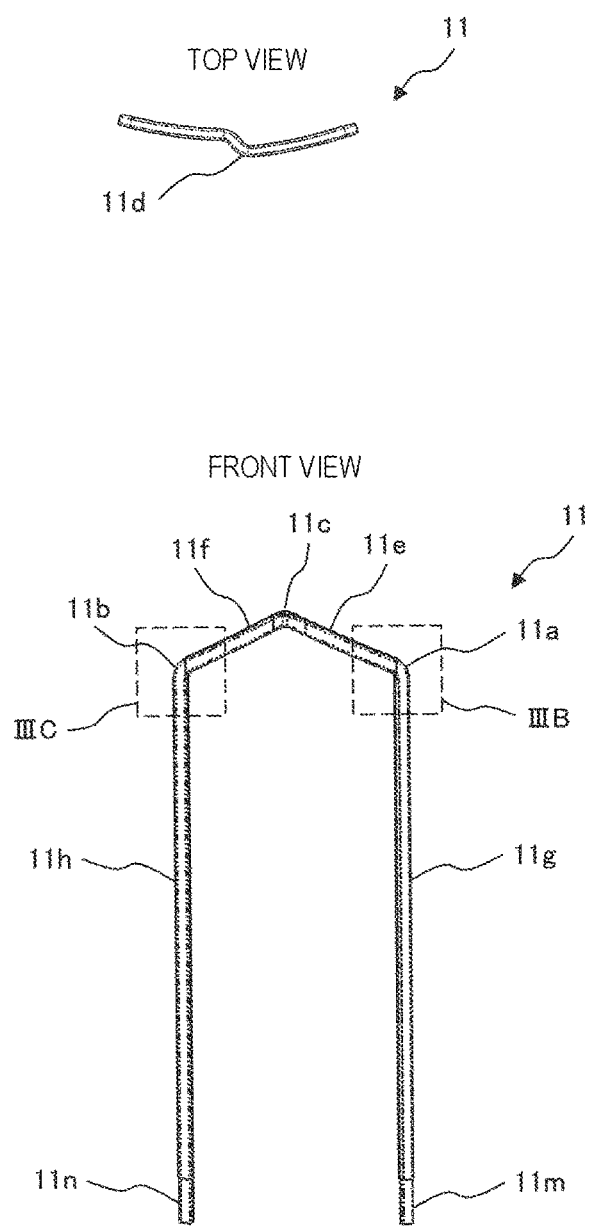
FIG. 3A shows a top view and a front view of a segment coil 11 according to the first embodiment.
Figure 3B:
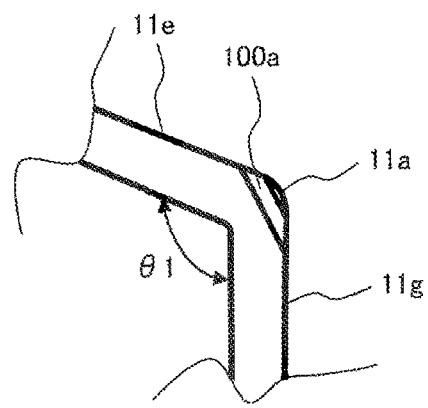
FIG. 3B is an enlarged view of a principal part in an area IIIB in FIG. 3A.
Figure 3B:
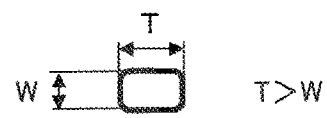
Figure 3C:
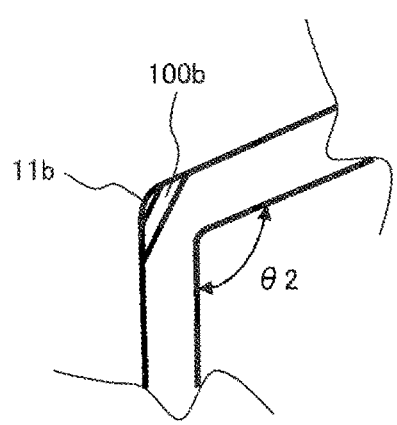
FIG. 3C is an enlarged view of a principal part in an area IIIC in FIG. 3A.

A configuration of each segment coil 11 will then be described with reference to FIGS. 3A to 3C. FIG. 3A shows a top view and a front view of the segment coil 11 according to the first embodiment, FIG. 3B is an enlarged view of a principal part in an area IIIB in FIG. 3A, and FIG. 3C is an enlarged view of a principal part in an area IIIC in FIG. 3A. In the first embodiment, an electric wire formed by coating copper with enamel is shown as an example of the segment coil 11. The segment coil 11 may be any type of an electric wire made of a metal conductor, and may be made of a metal different from copper, such as aluminum or iron.

As shown in FIGS. 3A to 3C, the segment coil 11 is formed by shaping a linear rectangular conductor, using a forming die and a jig (not illustrated), into a U shape. The segment coil 11 includes a shoulder part 11a (first bent part) and a shoulder part 11b (second bent part), which are bent to form the U shape, and a coil end top 11c, which is the bottom of the U shape. The shoulder parts 11a and 11b are each formed by edgewise bending by which long sides of a cross section of the rectangular conductor are bent sideways. The segment coil 11 of the first embodiment is given dimensions such that a thickness T in a bending direction is 3.6 mm and a width W in a bending width direction is 2.6 mm. In this manner, the segment coil 11 is formed into the U shape. The segment coil 11 formed into the U shape further includes a coil end crank part 11d, coil end conductor sloped parts 11e and 11f of a substantially arcuate shape as a whole, the coil end conductor sloped parts 11e and 11f being on both sides of the coil end top 11c and sloping down therefrom, respectively, conductor straight parts 11g and 11h extending respectively from the shoulder parts 11a and 11b, and open ends 11m and 11n that are respective front ends of the conductor straight parts 11g and 11h.

The segment coil 11 has a curved part and straight parts connected to the curved part. The curved part is made up of the shoulder parts 11a and 11b, the coil end top 11c, the coil end crank part 11d, and the coil end conductor sloped parts 11e and 11f, while the straight parts are made up of the conductor straight parts 11g and 11h and the open ends 11m and 11n.

The conductor straight part 11g and the open end 11m are inserted in one slot 12a among the plurality of slots 12a, while the conductor straight part 11h and the open end 11n are inserted in another slot 12a different from the one slot 12a in which the conductor straight part 11g and the open end 11m are inserted. The angle of the shoulder part 11a is θ1, and the angle of the shoulder part 11b is θ2. The angle θ1 and the angle θ2 determine the size of a pitch between the open end 11m and the open end 11n. On the shoulder parts 11a and 11b of the segment coil 11, press marks 100a and 100b are formed, respectively, the press marks 100a and 100b being dents that, in a front view of the U shape, sink in a front-to-rear direction (depthwise), from one surface of the shoulder part 11a and one surface of the shoulder part 11b, respectively. The press marks 100a and 100b are formed also on the other surfaces (back surfaces) of the shoulder parts 11a and 11b, respectively, the other surfaces being opposite respectively to the one surfaces (front surfaces) of the shoulder parts 11a and 11b, as dents sinking in the front-to-rear direction (depthwise). In other words, the press marks 100a and 100b are formed respectively on the front surfaces of the shoulder parts 11a and 11b and on the back surfaces of the same as well. The press marks 100a and 100b will be described in detail later.

As described above, the conductor straight part 11g and the conductor straight part 11h are inserted in different slots 12a, respectively. Because of this fact, at insertion of the segment coil 11 in the slots 12a, it is important to suppress variations in the size of a pitch between respective open ends 11m and 11n of the conductor straight parts 11g and 11h of the segment coil 11. In particular, an increase in the length of the conductor straight parts 11g and 11h results in an increase in variations in the size of the pitch between respective open ends 11m and 11n of the conductor straight parts 11g and 11h.

Figure 4A:
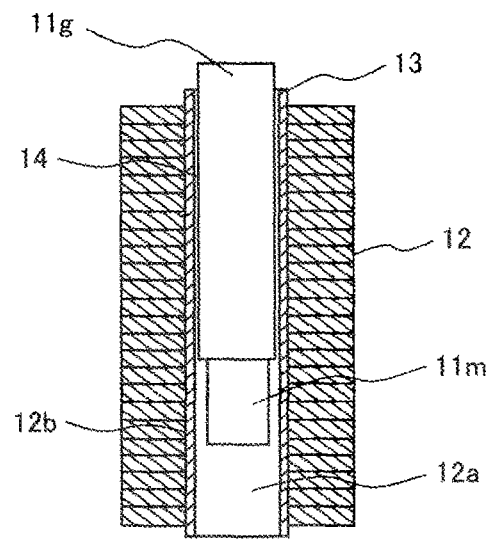
Figure 4B:
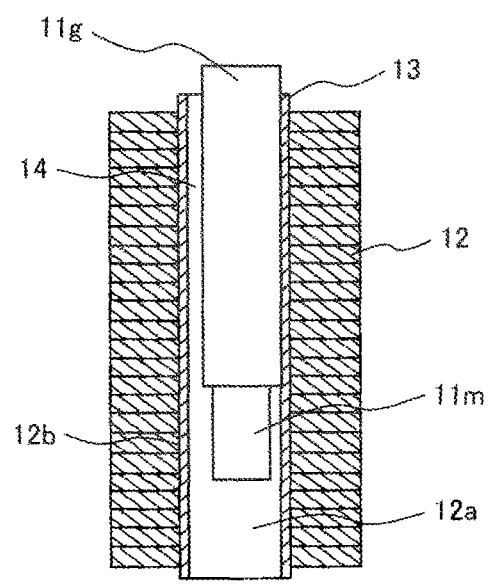
Figure 4C:
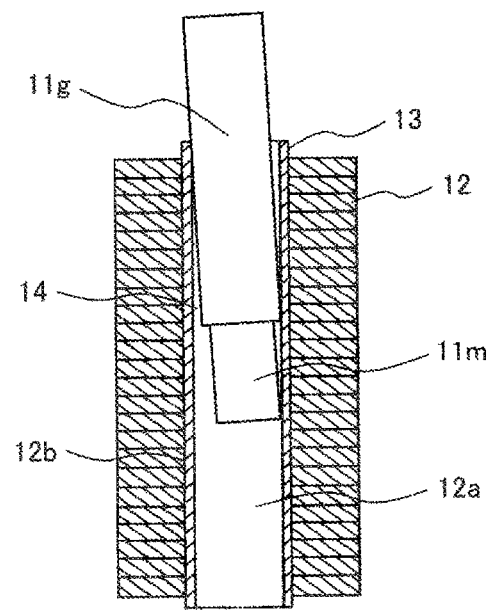
FIG. 4C is a cross-sectional view of the principal part of the stator core 12, showing a state in which the conductor straight part 11g of the segment coil 11 is inserted in the slot 12a in such a way as to be tilted therein.

States of the segment coil 11 being inserted in the slots 12a will be described with reference to FIGS. 4A to 4C. FIGS. 4A to 4C shows states of the conductor straight part 11g that result when the conductor straight part 11g is positioned by positioning at the open end 11n and is inserted in the slot 12a.

FIG. 4A is a cross-sectional view of a principal part of the stator core 12, showing a state in which the conductor straight part 11g of the segment coil 11 is inserted in the slot 12a in such a way as to be at a central part of the slot 12a, FIG. 4B is a cross-sectional view of the principal part of the stator core 12, showing a state in which the conductor straight part 11g of the segment coil 11 is inserted in the slot 12a in such a way as to be at a one-sided position on a side surface of the slot 12a, and FIG. 4C is a cross-sectional view of the principal part of the stator core 12, showing a state in which the conductor straight part 11g of the segment coil 11 is inserted in the slot 12a in such a way as to be tilted therein.

The stator core 12 is formed by stacking a plurality of electromagnetic steel plates. In the stator core 12, a plurality of slots 12a are formed in such a way as to penetrate the stack of electromagnetic steel sheets. Each slot 12a is provided with an insulation paper 13 stretched along a side surface 12b of the slot 12a.

FIG. 4A shows a case where the precision of the size of the pitch between respective open ends 11m and 11n of the conductor straight parts 11g and 11h is fine. In this case, the open end 11m (11n) does not come in contact with the insulation paper 13, and therefore the conductor straight part 11g of the segment coil 11 is inserted in the slot 12a as a given clearance 14 is maintained between the conductor straight part 11g of the segment coil 11 and the side surface 12b of the slot 12a. In this state, the space factor of the segment coil 11 in the slot 12a is improved, in which case a highly efficient electric motor can be provided.

In contrast, when the precision of the size of the pitch between respective open ends 11m and 11n of the conductor straight parts 11g and 11h varies, states shown in FIGS. 4B and 4C result.

FIG. 4B shows a case where the inserted conductor straight part 11g of the segment coil 11 is at a one-sided position on the side surface of the slot 12a, and, consequently, a part of the conductor straight part 11g comes into contact with the insulation paper 13. At a position where the conductor straight part 11g is not in contact with the insulation paper 13, the clearance 14 of a larger size is formed. When the segment coil 11 is inserted as the conductor straight part 11g is in contact with the insulation paper 13, it produces greater friction, thus increasing an insertion load in size. To avoid such a situation, the fine precision of the size of the pitch between respective open ends 11m and 11n is important.

In the case of FIG. 4C, when the angle θ1 of the shoulder part 11a and the angle θ2 of the shoulder part 11b (see FIG. 3C) fail to match target angles, the conductor straight part 11g is put in a state of being tilted against the side surface 12b of the slot 12a, and, consequently, the conductor straight part 11g and the open end 11m come in contact with the insulation paper 13. When the conductor straight part 11g in this state is further pushed in, the tilted conductor straight part 11g moves along the side surface 12b of the slot 12a as insertion of the conductor straight part 11g progresses further. This increases a load that deforms the conductor straight part 11g and a contact pressure as well, and these load and pressure are added to the insertion load. As a result, the insertion load further grows larger. In addition, the tilted conductor straight part 11g may damage the insulation paper 13, which is another concern.

Figure 5A:
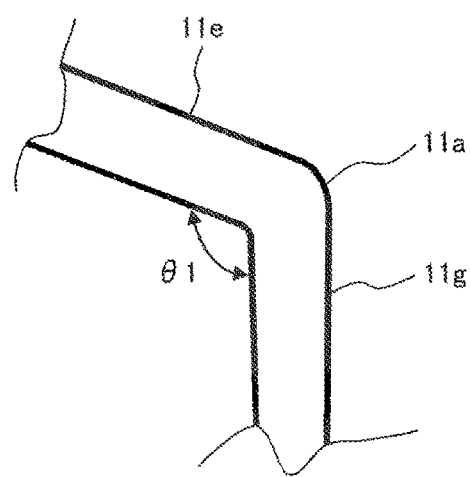
Figure 5B:
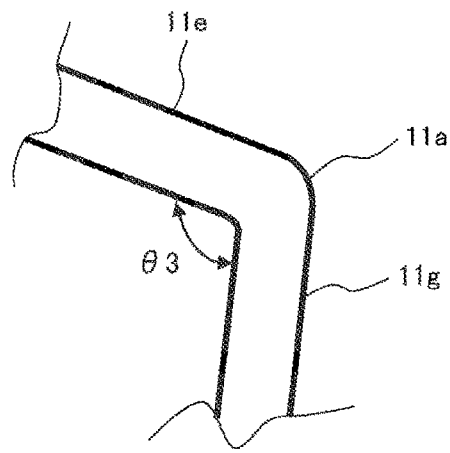
FIG. 5B is an enlarged view of the principal part, showing a bending angle of the shoulder part 11a that results after a bending process.
Figure 5C:
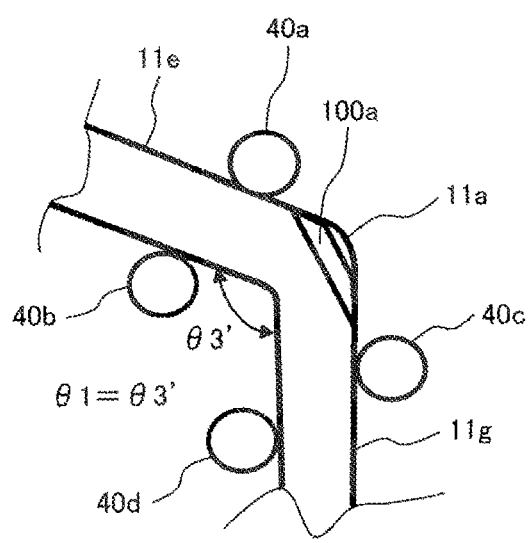
FIG. 5C is an enlarged view of the principal part, showing a bending angle of the shoulder part 11a that results after bending angle adjustment.

A method of adjusting the size of the pitch between the open ends 11m and 11n will then be described with reference to FIGS. 5A to 5C. FIG. 5A is an enlarged view of the principal part, showing a target bending angle of the shoulder part 11a, FIG. 5B is an enlarged view of the principal part, showing a bending angle of the shoulder part 11a that results after a bending process, and FIG. 5C is an enlarged view of the principal part, showing a bending angle of the shoulder part 11a that results after bending angle adjustment.

The bending angle of the shoulder part 11a is determined so that the size of the pitch between the open ends 11m and 11n of the segment coil 11 is determined to be a prescribed size. In the first embodiment, as shown in FIG. 5A, the angle θ1 of the shoulder part 11a is defined as a target angle. In a process of bending the segment coil 11, springing back, a phenomenon that a bent part tries to return to its original state, occurs. By taking into consideration this springing back, therefore, the shoulder part 11a is bent to an angle θ3 smaller than the target angle, i.e., angle θ1 (θ1>θ3), as shown in FIG. 5B. The segment coil 11 with the shoulder part 11a bent at the angle θ3 is then released from the forming die and jig.

The segment coil 11 released from the forming die and jig is then mounted on a press mark forming device, which will be described later. The press mark forming device has guide pins 40a to 40d that adjust the angle of the shoulder part 11a of the segment coil 11. The guide pin 40a and the guide pin 40b are arranged in such a way as to sandwich the coil end conductor sloped part 11e, and the guide pin 40c and the guide pin 40d are arranged in such a way as to sandwich the conductor straight part 11g. In a state where the coil end conductor sloped part 11e and the conductor straight part 11g are sandwiched between the guide pin 40a and the guide pin 40b and between the guide pin 40c and the guide pin 40d, respectively, the guide pin 40c and the guide pin 40d are operated to cause the conductor straight part 11g to make movement that increases the angle of the shoulder part 11a. The guide pin 40c and the guide pin 40d are then stopped from operating at a position where the angle of the shoulder part 11a is an angle θ3', which is equivalent to the target angle θ1 of the shoulder part 11a (θ1=θ3').

In a state where the angle of the shoulder part 11a is fixed to the angle θ3' (θ1), a press mark 100a is formed on the shoulder part 11a. The press mark 100a is formed by pressing the front surface of the segment coil 11, using a punch or the like, to dent the segment coil 11 so that the width W of the segment coil 11 on the shoulder part 11a becomes smaller than the width W on other parts of the segment coil 11. After press marks 100a and 100b are formed, the segment coil 11 is released from the press mark forming device, which leaves the angle of the shoulder part 11a fixed to the angle θ3' (θ1).

At the shoulder part 11a, the material is plastically deformed by an external pressure, and fluidization and hardening of the material cause a shape change. Hence the angle of the shoulder part 11a is fixed to the angle θ1. In the same manner, although it is not described herein, the press mark 100b is formed on the shoulder part 11b, of which the angle is fixed to the angle θ2, as shown in FIG. 3C.

Fixing the angle of the shoulder part 11a and the angle of the shoulder part 11b respectively to the angle θ1 and the angle θ2 improves the precision of the size of the pitch between respective open ends 11m and 11n of the conductor straight parts 11g and 11h. As a result, a target size of the pitch can be obtained.

In the first embodiment, as shown in FIGS. 3B, 3C, and 5C, the press marks 100a and 100b are formed outside the center of the shoulder parts 11a and 11b and inside the edge of an exterior side (one side surrounded by the U-shaped segment coil 11 is referred to as an interior side and the other side is referred to as an exterior side). The press marks 100a and 100b may be formed to include the edge of the exterior side of the shoulder parts 11a and 11b.

Figure 6A:
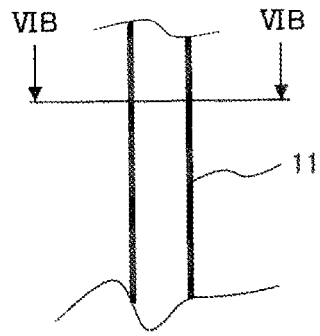
FIG. 6A is a front enlarged view of the segment coil not subjected to the bending process yet.
Figure 6B:
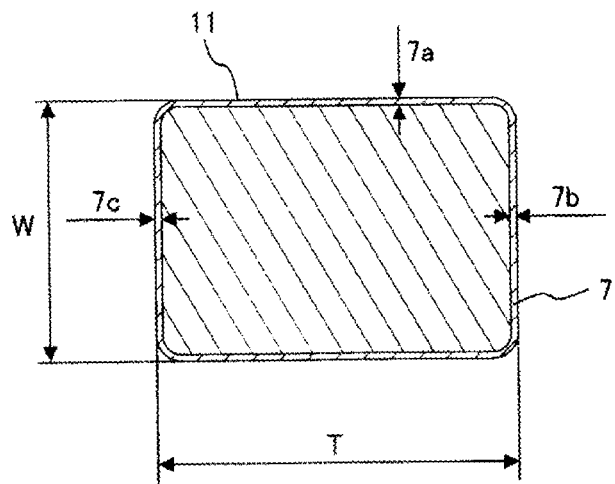
FIG. 6B is a cross-sectional view taken along a line VIB-VIB in FIG. 6A.
Figure 7A:
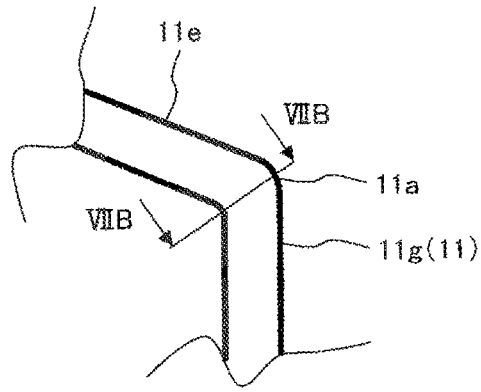
FIG. 7A is a front enlarged view of the segment coil having been subjected to the bending process but not having a press mark formed thereon yet.
Figure 7B:
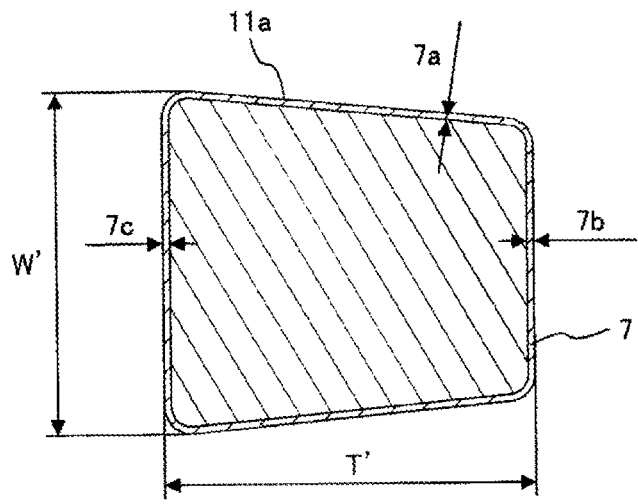
FIG. 7B is a cross-sectional view taken along a line VIIB-VIIB in FIG. 7A.
Figure 8A:
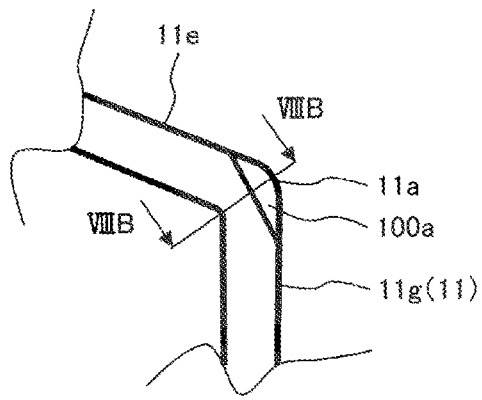
FIG. 8A is a front enlarged view of the segment coil on which a press mark has been formed.
Figure 8B:
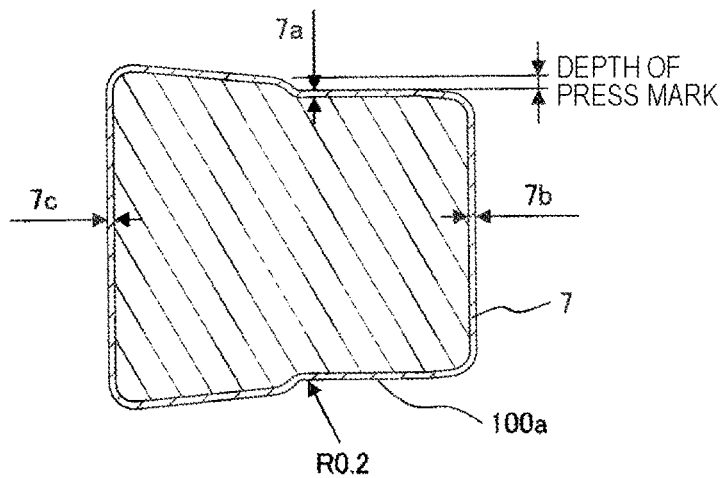
FIG. 8B is a cross-sectional view taken along line VIIIB-VIIIB in FIG. 8A.
Figures 9, 10:
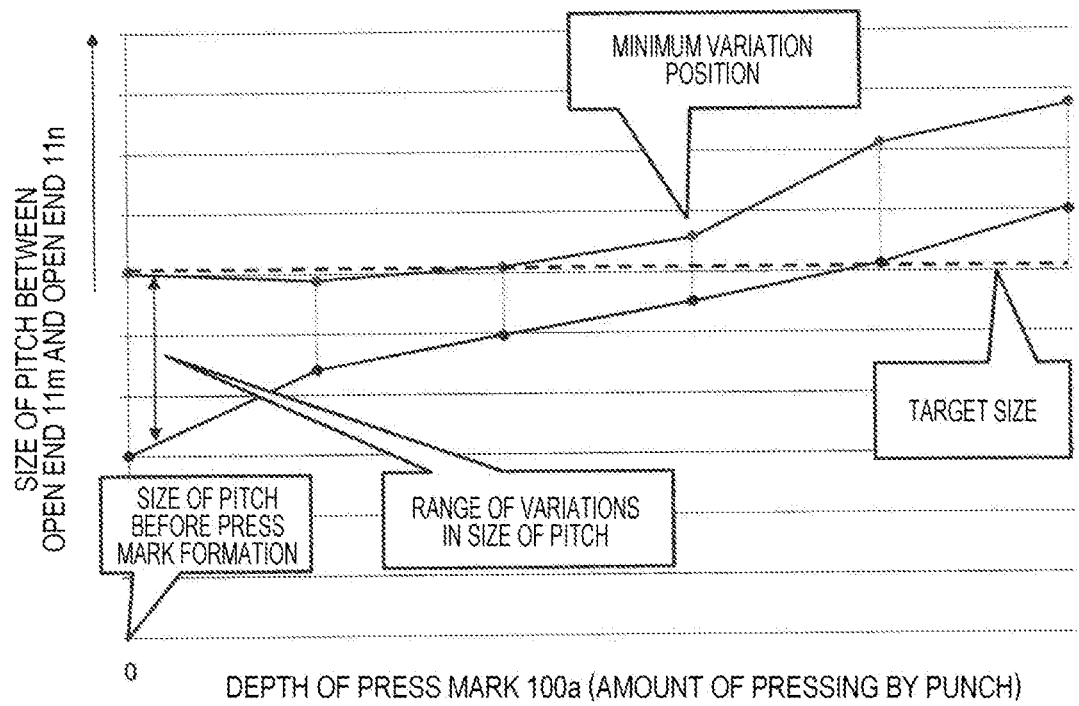

States of the shoulder part 11a will then be described with reference to FIGS. 6A to 9. FIG. 6A is a front enlarged view of the segment coil not subjected to the bending process yet, FIG. 6B is a cross-sectional view taken along a line VIB-VIB in FIG. 6A, FIG. 7A is a front enlarged view of the segment coil having been subjected to the bending process but not having a press mark formed thereon yet, FIG. 7B is a cross-sectional view taken along a line VIIB-VIIB in FIG. 7A, FIG. 8A is a front enlarged view of the segment coil on which a press mark has been formed, FIG. 8B is a cross-sectional view taken along line VIIIB-VIIIB in FIG. 8A, and FIG. 9 is a table in which film thicknesses of segment coils shown in FIGS. 6B, 7B, and 8B are compared. In FIGS. 8A and 8B, the press mark 100a is formed to include the edge of the exterior side of the shoulder part 11a.

In FIGS. 6B, 7B, and 8B, an enamel film 7 is formed on the outer periphery of the segment coil 11. The cross-sectional view of FIG. 6A taken along the line VIB-VIB is shown in FIG. 6B. As indicated in FIGS. 6B and 9, before the segment coil is subjected to the bending process, the enamel film 7 has a film thickness 7a of 61 μm, a film thickness 7b of 61 μm, and a film thickness 7c of 66 μm. The segment coil 11 of the first embodiment is given dimensions such that a thickness T in a bending direction is 3.6 mm and a width W in a bending width direction is 2.6 mm.

Edgewise bending the segment coil 11 causes its shape to change, turning the segment coil 11 into a shape shown in FIG. 7B. FIG. 7B is the cross-sectional view of FIG. 7A taken along the line VIIB-VIIB.

In FIG. 7B, which shows a cross section of the shoulder part 11a having been subjected to the bending process but not having the press mark 100a formed thereon yet, the film thickness 7a is 61 μm, the film thickness 7b is 52 μm, and the film thickness 7c is 74 μm. An enamel coating 6 changes in size as a result of the edgewise bending. The thickness in the bending direction of the shoulder part 11a reduces to a thickness T' (T>T'), and the bending width of the shoulder part 11a increases to a width W' on the interior side with respect to bending (W<W'). The film (film thickness 7b) on the exterior side with respect to bending is pulled at execution of the bending process and therefore its film thickness 7b is reduced to 52 μm, which is smaller than the film thickness 7c of 74 μm on the interior side with respect to bending. The film thickness 7b of 52 μm is the minimum thickness of the film on the shoulder part 11a.

For this reason, preventing a further reduction in the film thickness is necessary at formation of the press mark 100a. It is thus preferable that a connecting part connecting a part where the press mark 100a is formed to a part where the press mark 100a is not formed have a radius of curvature of R0.2 or more, as a connecting part that prevents a reduction in the film thickness, as shown in FIG. 8B. FIG. 8B is the cross-sectional view of FIG. 8A taken along the line VIIIB-VIIIB. In the first embodiment, the depth of the press mark 100a is determined to be 0.3 mm. The size of the pitch between the open end 11m and the open end 11n varies depending on the depth of the press mark 100a, that is, an amount of pressing by a punch or the like. FIG. 10 depicts a relationship between the size of the pitch between the open end 11m and the open end 11n of the conductor straight parts and the depth of the press mark 100a.

In FIG. 10, the vertical axis represents the size of the pitch between the open end 11m and the open end 11n of the conductor straight parts, and the horizontal axis represents the depth of the press mark 100a (amount of pressing by the punch). A broken line extending in the direction of the horizontal axis represents the target size of the pitch between the open end 11m and the open end 11n. It is preferable that a shift of the size of the pitch between the open ends 11m and 11n from the target size be made small and that a range (width) of variations in the size of the pitch be made small. In FIG. 10, a reduction in a gap between the upper limit and the lower limit of the range of variations indicates a reduction in the variations in the size of the pitch between the open end 11m and the open end 11n.

FIG. 10 demonstrates that before formation of the press mark 100a, the range of variations in the size of the pitch between the open end 11m and the open end 11n is large. In this state, when the shoulder part 11a is pressed to increase the depth of the press mark 100a, it reduces the range of variations in the size of the pitch between the open end 11m and the open end 11n. When the depth of the press mark 100a is increased further, however, the range of variations in the size of the pitch between the open end 11m and the open end 11n increases again.

Observing this tendency finds a point at which the range of variations in the size of the pitch between the open end 11m and the open end 11n reduces to the minimum and a central part of the range almost matches the target size. The depth of the press mark 100a corresponding to this point is thus adopted. To determine the depth of the press mark 100a, other factors, such as the thickness of the enamel film 7 and the dielectric breakdown voltage of the segment coil 11, which is needed for a product in which the electric motor is incorporated, must also be taken into consideration. The depth of the press mark 100a is therefore determined according to the range of variations in the size of the pitch between the open end 11m and the open end 11n, the thickness of the enamel film 7, and the dielectric breakdown voltage of the segment coil 11.

In the first embodiment, the press mark 100a is formed on both surfaces of the segment coil 11. However, the press mark 100a may be formed only on the one surface of the segment coil 11. In the first embodiment, the radius of curvature of the connecting part is determined to be R0.2. However, the radius of curvature of the connecting part may be determined appropriately in accordance with the depth of the press mark 100a that is determined according to the above-described conditions.

In the first embodiment, the press mark 100a is formed on the shoulder parts 11a and 11b by applying a pressure to them. This process causes the shoulder parts 11a and 11b to deform plastically, causing the metal present on the shoulder parts 11a and 11b to fluidize and harden. Hence the angel of the shoulder part 11a and the angle of the shoulder part 11b are fixed respectively to the angle θ1 and the angle θ2, which are the target angles. As a result, the size of the pitch between the open end 11m of the conductor straight part 11g and the open end 11n of the conductor straight part 11h is set to the target size.

According to the first example, variations in the size of the pitch between the open end 11m of the conductor straight part 11g and the open end 11n of the conductor straight part 11h can be suppressed, and therefore easiness in insertion of segment coil 11 can be improved.

According to the first embodiment, the stack thickness of the stator core 12 can be increased as easiness in insertion of the segment coil 11 is improved. An electric motor with improved efficiency, therefore, can be provided.

Furthermore, the ratio of an area occupied by the segment coil 11 in the slot 12a can be increased. An electric motor with improved efficiency, therefore, can be provided.

Second Embodiment

Figure 11A:
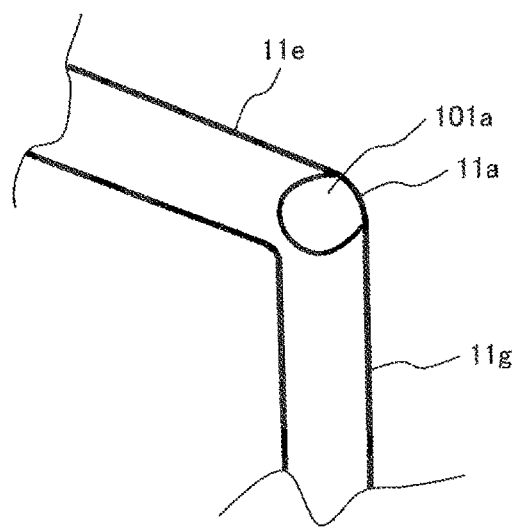
FIG. 11A is an enlarged view of a principal part of the shoulder part 11a of the segment coil 11 according to a second embodiment.
Figure 11B:
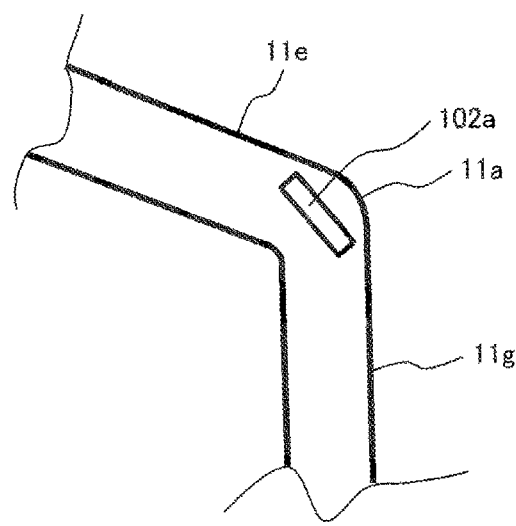
FIG. 11B is an enlarged view of the principal part of the shoulder part 11a of the segment coil 11 according to the second embodiment.

A second embodiment of the present invention will be described with reference to FIGS. 11A and 11B. FIGS. 11A and 11B are enlarged views of a principal part of the shoulder part 11a of the segment coil 11 according to a second embodiment. The second embodiment is different from the first embodiment in the shape of the press mark.

In FIG. 11A, the press mark 101a is formed in such a way as to sink in from the edge of the exterior side of the shoulder part 11a toward the interior side. The press mark 101a does not reach the edge of the interior side of the shoulder part 11a, and the inside of the press mark 101a is formed into an arc shape. The press mark 101a of this shape allows simplification of the jig used to form the press mark 101a.

In FIG. 11B, the press mark 102a is formed in a range that does not reach respective exterior-side edges and interior-side edges of the shoulder part 11a, the coil end conductor sloped part 11e, and the conductor straight part 11g. The press mark 102a is formed in such a way as to be linearly inclined against the conductor straight part 11g and to extend from the conductor straight part 11g toward the coil end top 11c (FIG. 3A) of the segment coil 11.

The second embodiment, which offers the effects of the first embodiment, offers an additional effect of expansion of types of jigs that can be used for press mark formation.

Third Embodiment

Figure 12A:
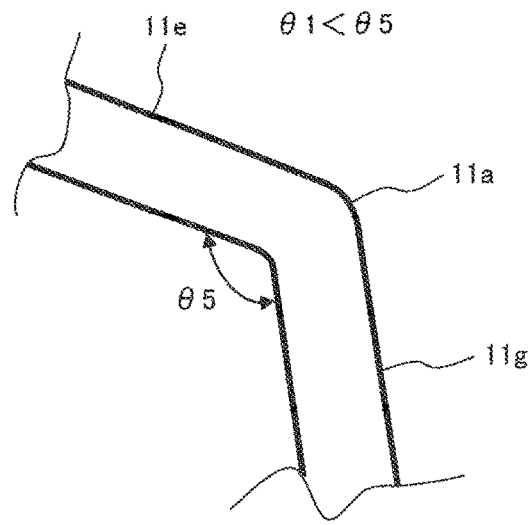
FIG. 12A is an enlarged view of a principal part of the shoulder part 11a of the segment coil 11 according to a third embodiment.
Figure 12B:
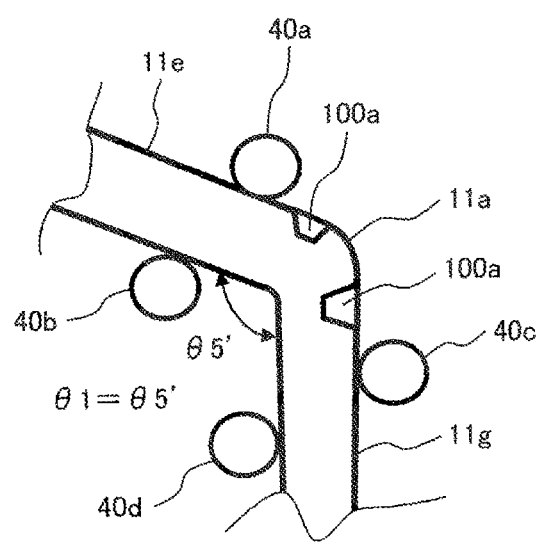
FIG. 12B is an enlarged view of the principal part of the shoulder part 11a of the segment coil 11 according to the third embodiment.

A third embodiment of the present invention will be described with reference to FIGS. 12A and 12B. FIGS. 12A and 12B are enlarged views of a principal part of the shoulder part 11a of the segment coil 11 according to a third embodiment. The third embodiment is different from the first embodiment in an angle of edgewise bending.

An angle $\theta 5$ of the third embodiment shown in FIG. 12A has the following relationship with the angles $\theta 1$ and $\theta 3$ of the first embodiment: $\theta 3 < \theta 1 < \theta 5$.

The target angle of the shoulder part 11a of the third embodiment is the same as the target angle of the first embodiment, that is, the angle $\theta 1$. In the process of bending the segment coil 11, springing back, the phenomenon of a bent part's trying to return its original state, occurs. By taking into consideration this springing back, therefore, the shoulder part 11a is bent to the angle $\theta 5$ larger than the target angle $\theta 1$ ($\theta 1 < \theta 5$), as shown in FIG. 12B. The segment coil 11 with the shoulder part 11a bent at the angle $\theta 5$ is then released from the forming die and jig.

The segment coil 11 released from the forming die and jig is then mounted on a press mark forming device, which will be described later. The press mark forming device has guide pins 40a to 40d that adjust the angle of the shoulder part 11a of the segment coil 11. The guide pin 40a and the guide pin 40b are arranged in such a way as to sandwich the coil end conductor sloped part 11e, and the guide pin 40c and the guide pin 40d are arranged in such a way as to sandwich the conductor straight part 11g. In a state where the coil end conductor sloped part 11e and the conductor straight part 11g are sandwiched between the guide pin 40a and the guide pin 40b and between the guide pin 40c and the guide pin 40d, respectively, the guide pin 40c and the guide pin 40d are operated to cause the conductor straight part 11g to make movement that reduces the angle of the shoulder part 11a. The guide pin 40c and the guide pin 40d are then stopped from operating at a position where the angle of the shoulder part 11a is an angle $\theta 5'$, which is equivalent to the target angle $\theta 1$ of the shoulder part 11a ($\theta 1 = \theta 5'$).

In a state where the angle of the shoulder part 11a is fixed to the angle $\theta 5'$ ($\theta 1$), the press mark 100a is formed on the shoulder part 11a. The press mark 100a is formed by pressing the front surface of the segment coil 11, using a punch or the like, to dent the segment coil 11 so that the width W of the segment coil 11 on the shoulder part 11a becomes smaller than the width W on other parts of the segment coil 11. After the press marks 100a and 100b are formed, the segment coil 11 is released from the press mark forming device, which leaves the angle of the shoulder part 11a fixed to the angle $\theta 5'$ ($\theta 1$). It should be noted that the press mark 100a of the third embodiment is formed as divided portions of the press mark 100a that sandwich the shoulder part 11a. The press mark 100b is too formed in this manner.

According to the third embodiment, the shoulder part 11a is bent edgewise to the angle $\theta 5$ larger than the target angle $\theta 1$ and then the angle $\theta 5$ is adjusted to the target angle $\theta 1$ ($\theta 5'$). This process, which offers the effects of the first embodiment, offers an additional effect of reducing a working time required for adjusting the angle of the shoulder part 11a to the target angle $\theta 1$ ($\theta 5'$).

Fourth Embodiment

Figure 13:
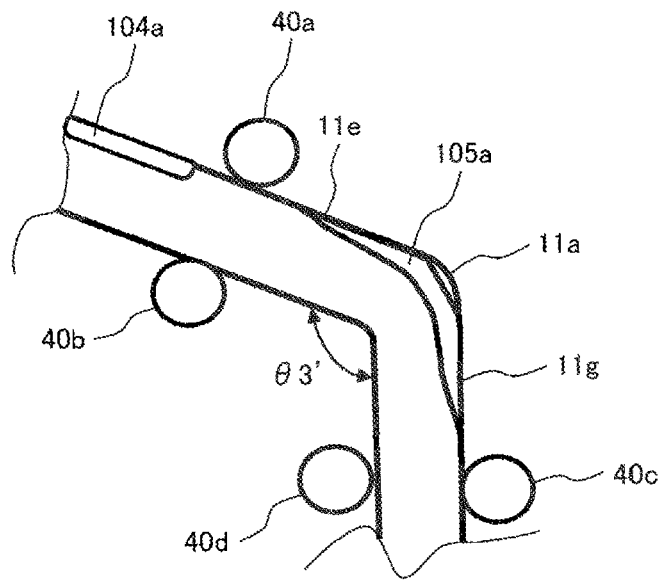
FIG. 13 is an enlarged view of a principal part of the shoulder part 11a of the segment coil 11 according to a fourth embodiment.

A fourth embodiment of the present invention will be described with reference to FIG. 13. FIG. 13 is an enlarged view of a principal part of the shoulder part 11a of the segment coil 11 according to a fourth embodiment. The fourth embodiment is different from the first embodiment in the number of press marks and in parts where the press marks are formed.

In FIG. 13, a press mark 104a is formed on the coil end conductor sloped part 11e connected to the shoulder part 11a while a press mark 105a is formed on an area extending over the coil end conductor sloped part 11e, the shoulder part 11a, and the conductor straight part 11g. The coil end conductor sloped part 11e and the shoulder part 11a form a curved part of the segment coil 11, and the conductor straight part 11g forms a straight part of the segment coil 11. In other words, the press mark 104a is formed on the straight part, while the press mark 105a is formed on a part of the curved part and a part of the straight part.

In the fourth embodiment, pressing the coil end conductor sloped part 11e and the area extending over the coil end conductor sloped part 11e, the shoulder part 11a, and the conductor straight part 11g causes the copper making up the segment coil 11 to harden and creates a tendency of outward expansion in the shape. This results in an increase in a second moment of area at the shoulder part 11a, thus improving its bending rigidity. Although it is not illustrated, this applies also to the shoulder part 11b, the coil end conductor sloped part 11f, and the conductor straight part 11h.

When the segment coil 11 is inserted in the slots 12a, the coil end top 11c and the coil end conductor sloped parts 11e and 11f are pushed in, and therefore the coil end conductor sloped parts 11e and 11f are deformed by an insertion load applied thereto. However, according to the fourth embodiment, because the press mark 104a is formed on the coil end conductor sloped parts 11e and 11f, deformation of the coil end conductor sloped parts 11e and 11f can be suppressed. As a result, easiness in insertion of the segment coil 11 in the slots 12a can be improved.

Fifth Embodiment

A fifth embodiment of the present invention will be described with reference to FIGS. 14 and 15. FIGS. 14A and 14B are cross-sectional views of a principal part of a press mark forming device 200, and FIG. 15 is a flowchart showing steps of press mark formation by the press mark forming device 200.

Figure 14A:
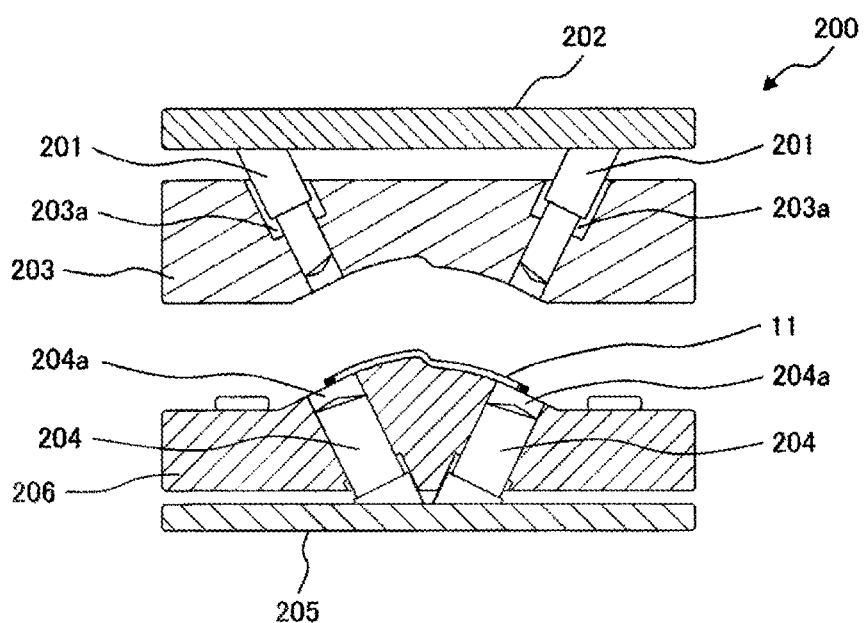
FIG. 14A is a cross-sectional view of a principal part of a press mark forming device 200.
Figure 14B:
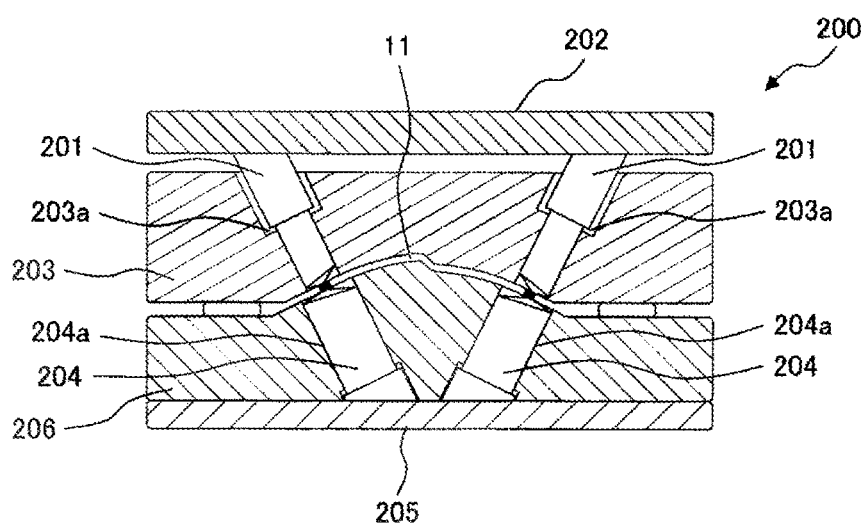
FIG. 14B is a cross-sectional view of the principal part of the press mark forming device 200.
Figure 15:
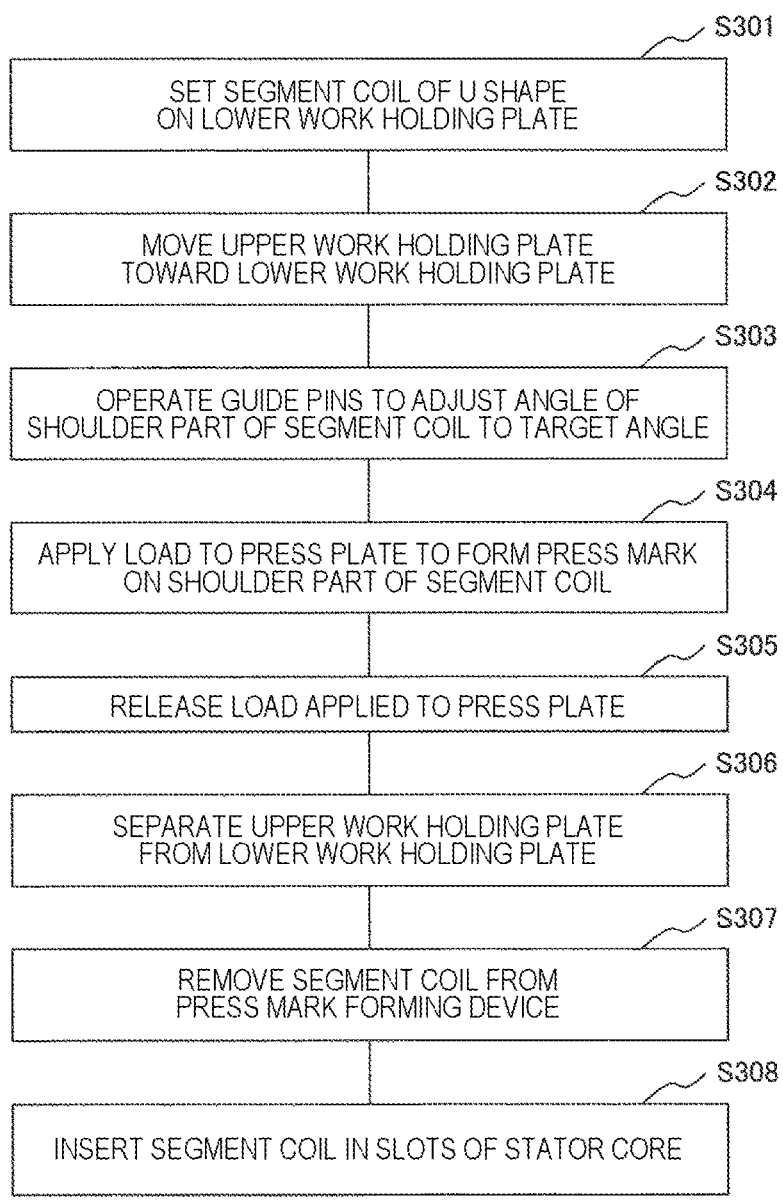
FIG. 15 is a flowchart showing steps of press mark formation by the press mark forming device 200.

The press mark forming device 200 includes upper punches 201 that form press marks on one surface of the segment coil 11, a press plate 202 having the upper punches 201, the press plate 202 giving a press force to the upper punches 201, an upper work holding plate 203 having guide holes 203a (upper guide holes) formed thereon to guide movement of the upper punches 203, lower punches 204 that form press marks on the other surface of the segment coil 11, a receiving plate 205 having the lower punches 204, the receiving plate 205 giving a press force to the lower punches 204, a lower work holding plate 206 having guide holes 204a (lower guide holes) formed thereon to guide movement of the lower punches 204, and the guide pins 40a to 40d (which are not shown FIGS. 14A and 14B but can be confirmed by referring to FIGS. 5C, 12B, and 13). A spring, which is not illustrated, is set between the press plate 202 and the upper work holding plate 203, and an urging force of the spring creates a given gap between the press plate 202 and the upper work holding plate 203. In the same manner, a spring is set between the receiving plate 205 and the lower work holding plate 206, and an urging force of the spring creates a given gap between the receiving plate 205 and the lower work holding plate 206.

A central part of the lower work holding plate 206 is of a convex shape bulging toward the upper work holding plate 203, and a central part of the upper work holding plate 203 is of a concave shape that fits with the convex shape of the lower work holding plate 206.

The press mark forming device 200 operates in the following manner.

As shown in FIG. 14A, the segment coil 11 of the U shape having been bent edgewise is set on the central part of the lower work holding plate 206 (step S301: step of setting the segment coil of the U shape on the lower work holding plate).

Subsequently, a load generator (not illustrated) is actuated to move the upper work holding plate 203 toward the lower work holding plate 206 and cause the upper work holding plate 203 and the lower work holding plate 206 to hold and fix the segment coil 11 therebetween (step S302: step of moving the upper work holding plate toward the lower work holding plate and fixing the segment coil 11). Because the weights of the press plate 202 and upper work holding plate 203 as well as the weight of the load generator are applied to the lower work holding plate 206, the lower work holding plate 206 moves toward the receiving plate 205. As a result of movement of the lower work holding plate 206, each lower punch 204 moves in the guide hole 204a, causing a front end of the lower punch 204 to face the other surface of the segment coil 11.

Subsequently, the guide pins 40a to 40d are operated to adjust the angles of the shoulder parts 11a and 11b of the segment coil 11 respectively to the target angles θ1 (step S303: step of operating the guide pins to adjust the angle of the shoulder part of the segment coil to the target angle).

Subsequently, the load generator is actuated to further apply a load to the press plate 202, pushing the press plate 202 toward the upper work holding plate 203 so hard that the press plate 202 overcomes the urging force of the spring. Pushing the press plate 202 in such a manner causes the upper punches connected to the press plate 202 to move in the guide holes 203a and finally come out thereof. The upper punches thus press one surface of the shoulder parts 11a and 11b of the segment coil 11 to form the press marks 100a and 100b. When the press force of the press plate 202 is further applied, the lower punches 204 come out of the guide holes 204a to press the other surface of the shoulder parts 11a and 11b of the segment coil 11, thus forming the press marks 100a and 100b (step S304: step of applying a load to the press plate 202 to form the press marks 100a and 100b on the shoulder parts 11a and 11b of the segment coil 11). As described above, when the press mark becomes too deep, variations in the size of the pitch between the open ends increases. To avoid this, the load generator operates in such a way as to adjust the load applied to the press plate 202.

When formation of the press marks 100a and 100b is over, the press plate 202 is released from the load applied by the load generator (step S305: step of releasing the press plate 202 from a load). When the press plate 202 is released from the load, the urging force of the spring set between the press plate 202 and the upper work holding plate 203 separates the press plate 202 and the upper work holding plate 203 from each other. In the same manner, the urging force of a spring disposed between the receiving plate 205 and the lower work holding plate 206 separates the receiving plate 205 and the lower work holding plate 206 from each other.

Subsequently, the upper work holding plate is lifted to separate it from the lower work holding plate 206 (step S306: step of separating the upper work holding plate from the lower work holding plate 206).

Then, the segment coil 11 with the shoulder parts 11a and 11b fixed in angle respectively to the angle θ1 and the angle θ2 are removed from the press mark forming device (step S307: step of removing the segment coil 11 from the press mark forming device).

A plurality of segment coils 11 removed from the press mark forming device are collected and are inserted in the slots 12a of the stator core 12, as shown in FIG. 1 (step S308: step of inserting the segment coil 11 in the slots 12a of the stator core 12).

In the above manner, the stator of the electric motor is manufactured.

According to the fifth embodiment, a manufacturing method for the stator of the electric motor, the manufacturing method suppressing variations in the angle of the shoulder part of the segment coil to improve easiness in inserting segment coils in the stator core, can be provided.

It should be noted that the present invention is not limited to the above embodiments but includes various modifications.

The above embodiments have been described in detail for easy understanding of the present invention, and are not necessarily limited to an embodiment including all the constituent elements described above.

REFERENCE SIGNS LIST 10 stator
11 segment coil
11a shoulder part (first bent part)
11b shoulder part (second bent part)
11c coil end top
11d coil end crank part
11e, 11f coil end conductor sloped part
11g, 11h conductor straight part
11m, 11n open end
12 stator core
12a slot
12b side surface
13 insulation paper 14 clearance
100a, 100b, 101a, 102a, 104a, 105a press mark
200 press mark forming device
201 upper punch
202 press plate
203 upper work holding plate
203a guide hole
204 lower punch
204a guide hole
205 receiving plate
206 lower workpiece holding plate

The invention claimed is:

1. A stator of an electric motor, the electric motor including the stator in which a plurality of slots are formed, and a plurality of segment coils of U shapes inserted respectively in the plurality of slots, wherein
   each of the segment coils includes a first bent part and a second bent part that are bent to form a U shape,
   in a front view of the U shape, a press mark is formed on the first bent part and on the second bent part, the press mark being a dent sinking in a front-to-rear direction, from one surface of the first bent part and from one surface of the second bent part, and
   the press mark is formed outside a central part of the first bent part and outside a central part of the second bent part.

2. The stator of the electric motor, according to claim 1, wherein
   the segment coil is composed of a rectangular conductor, and the first bent part and the second bent part are formed by bending the rectangular conductor edgewise.

3. The stator of the electric motor, according to claim 1, wherein
   the press mark is formed on another surface opposite to the one surface of the first bent part and on another surface opposite to the one surface of the second bent part.

4. The stator of the electric motor, according to claim 1, wherein
   a radius of curvature of a connecting part connecting a part where the press mark is formed to a part where the press mark is not formed is determined to be R0.2 or more.

5. The stator of the electric motor, according to claim 1, wherein
   the press mark is formed inside an edge of an exterior side of the first bent part and inside an edge of an exterior side of the second bent part.

6. The stator of the electric motor, according to claim 1, wherein
   the press mark is formed over an edge of an exterior side of the first bent part and over an edge of an exterior side of the second bent part.

7. The stator of the electric motor, according to claim 1, wherein
   the press mark is formed in such a way as to sink in from an edge of an exterior side of the first bent part and an edge of an exterior side of the second bent part, toward an interior side, and
   an inside of the press mark is formed into an arc shape.

8. The stator of the electric motor, according to claim 1, wherein
   the segment coil includes a curved part having the first bent part and the second bent part, and a straight part connected to the curved part, and
   the press mark is formed to be linearly inclined against the straight part.

9. The stator of the electric motor, according to claim 1, wherein
   the segment coil includes a curved part having the first bent part and the second bent part, and a straight part connected to the curved part, and
   a press mark is formed on a part of the straight part.

10. The stator of the electric motor, according to claim 9, wherein
    the curved part includes a coil end conductor sloped part connected to the first bent part and the second bent part, and
    a press mark is formed on the coil end conductor sloped part.

11. A manufacturing method for a stator of an electric motor in which a plurality of segment coils of U shapes are inserted respectively into a plurality of slots formed in the stator, wherein
    each of the segment coils includes a first bent part and a second bent part that are bent to form a U shape,
    in a front view of the U shape, press marks are formed on the first bent part and on the second bent part, the press marks being dents sinking in a front-to-rear direction, from one surface of the first bent part and another surface opposite to the one surface of the first bent part, respectively, and from one surface of the second bent part and another surface opposite to the one surface of the second bent part, respectively,
    the press marks are formed by a press mark forming device,
    the press mark forming device includes
    an upper punch that forms a press mark on one surface of the segment coil,
    a press plate that has the upper punch and gives a press force to the upper punch,
    an upper work holding plate that has an upper guide hole formed thereon to guide movement of the upper punch,
    a lower punch that forms a press mark on another surface of the segment coil,
    a receiving plate that has the lower punch and gives a press force to the lower punch,
    a lower work holding plate that has a lower guide hole formed thereon to guide movement of the lower punch, and
    a guide pin that adjusts respective angles of the first bent part and the second bent part of the segment coil, and
    the press mark forming device executes the steps of
    setting the segment coil on the lower work holding plate,
    moving the upper work holding plate toward the lower work holding plate to fix the segment coil,
    operating the guide pin to adjust respective angles of the first bent part and the second bent part of the segment coil to target angles,
    applying a load to the upper work holding plate and the lower work holding plate to form the press marks respectively on the first bent part and the second bent part of the segment coil,
    releasing the load applied to the upper work holding plate and the lower work holding plate, and
    separating the upper work holding plate from the lower work holding plate.

* * * * *